United States Patent
Kobo et al.

(10) Patent No.: US 11,252,073 B1
(45) Date of Patent: Feb. 15, 2022

(54) FAST, RELIABLE, AND EXTENSIBLE ACTIVE-STANDBY MULTI-VENDOR LINK REDUNDANCY

(71) Applicant: Cisco Technology, Inc., San Jose, CA (US)

(72) Inventors: Roberto Kobo, Pleasanton, CA (US); Frank Peraza, Tucson, AZ (US); Omer Ali, San Jose, CA (US); Muhammad Ahmad Imam, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 6 days.

(21) Appl. No.: 16/752,443

(22) Filed: Jan. 24, 2020

(51) Int. Cl.
| | |
|---|---|
| *H04L 12/26* | (2006.01) |
| *H04L 12/751* | (2013.01) |
| *H04L 12/713* | (2013.01) |
| *H04L 12/42* | (2006.01) |
| *H04L 12/717* | (2013.01) |
| *H04L 12/753* | (2013.01) |

(52) U.S. Cl.
CPC .............. *H04L 45/02* (2013.01); *H04L 12/42* (2013.01); *H04L 45/42* (2013.01); *H04L 45/48* (2013.01); *H04L 45/586* (2013.01)

(58) Field of Classification Search
None
See application file for complete search history.

(56) References Cited

U.S. PATENT DOCUMENTS

| | | | | |
|---|---|---|---|---|
| 8,208,407 B2* | 6/2012 | Tallet | ............... | H04L 12/462 370/255 |
| 8,355,348 B1* | 1/2013 | Miller | ............... | H04L 12/42 370/256 |
| 8,792,333 B2* | 7/2014 | Cheng | ............... | H04L 41/0668 370/218 |
| 2008/0205302 A1* | 8/2008 | Florit | ............... | H04L 12/462 370/255 |
| 2010/0039961 A1* | 2/2010 | Tallet | ............... | H04L 12/462 370/256 |
| 2012/0008530 A1* | 1/2012 | Kulkarni | ............... | H04L 12/42 370/256 |
| 2014/0010091 A1* | 1/2014 | North | ............... | H04L 45/28 370/242 |
| 2014/0344426 A1* | 11/2014 | Tsai | ............... | H04L 41/0816 709/221 |
| 2015/0350062 A1* | 12/2015 | Lindem, III | ............... | H04L 45/18 370/220 |
| 2017/0353382 A1* | 12/2017 | Gupta | ............... | H04L 45/28 |
| 2019/0356599 A1* | 11/2019 | Brissette | ............... | H04L 12/4675 |

* cited by examiner

*Primary Examiner* — Phirin Sam
(74) *Attorney, Agent, or Firm* — Merchant & Gould P.C.

(57) ABSTRACT

Network link redundancy may be provided. A node comprising a virtualization of a network topology comprising a plurality of devices may be provided. Next, the node may be provided with at least two ports. Each of the at least two ports may respectively comprise an inside facing portion that uses a first protocol and an outside facing portion that uses a second protocol. The node may operate using the first protocol. A behavioral mode of the at least two ports may be controlled and the behavioral mode of the at least two ports may be communicated to at least one other node outside the node.

20 Claims, 3 Drawing Sheets

FAST, RELIABLE, AND EXTENSIBLE ACTIVE-STANDBY MULTI-VENDOR LINK REDUNDANCY

TECHNICAL FIELD

The present disclosure relates generally to network link redundancy.

BACKGROUND

A computer network or data network may include or use a telecommunications network to connect multiple sites together and allow computers to exchange data. In computer networks, networked computing devices exchange data with each other using a data link. The connections between nodes are established using either cable media or wireless media. The best-known computer network is the Internet. Client address based forwarding of dynamic host configuration protocol response packets.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1A:
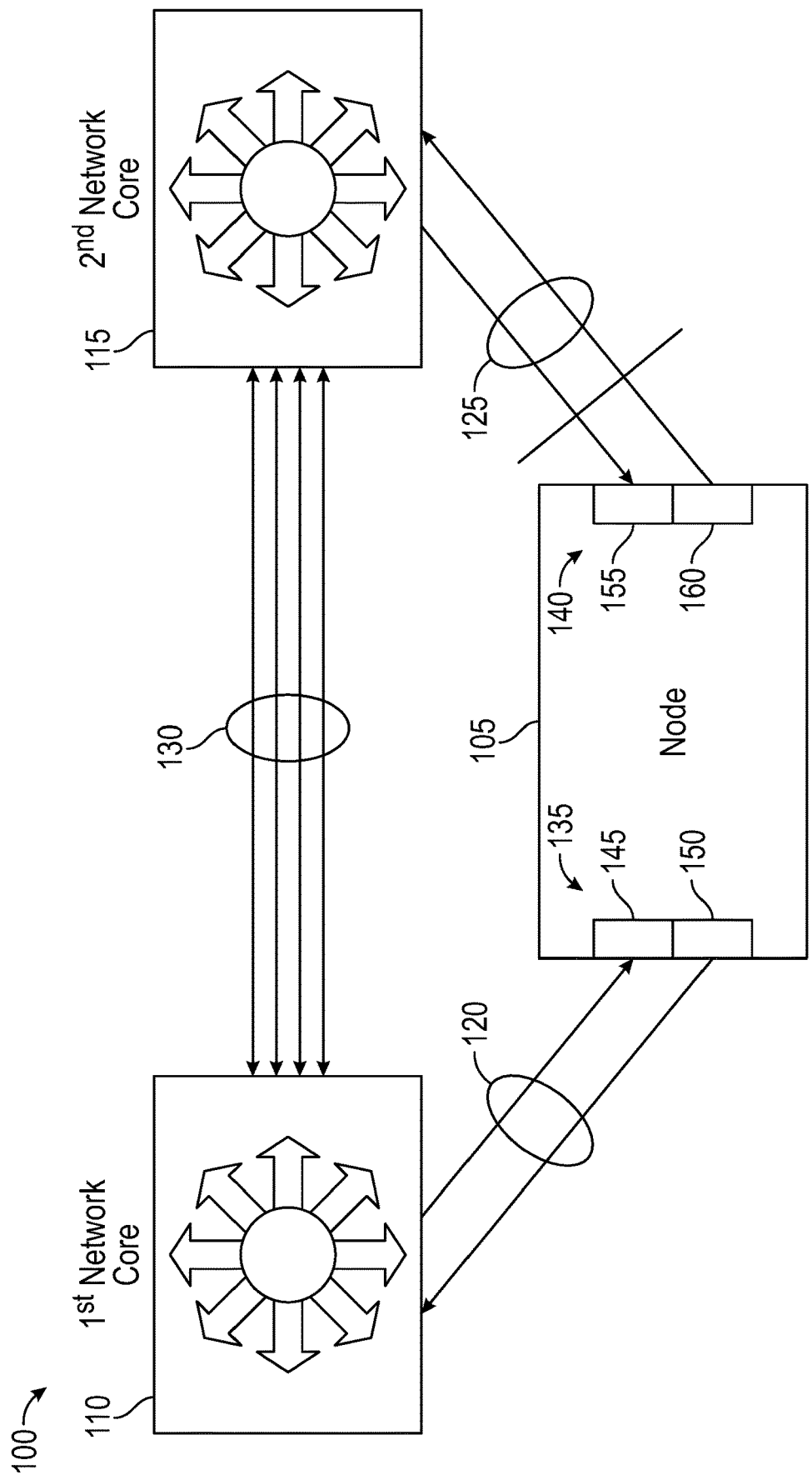
FIG. 1A is a block diagram of an operating environment.

Network link redundancy may be provided. A node comprising a virtualization of a network topology comprising a plurality of devices may be provided. Next, the node may be provided with at least two ports. Each of the at least two ports may respectively comprise an inside facing portion that uses a first protocol and an outside facing portion that uses a second protocol. The node may operate using the first protocol. A behavioral mode of the at least two ports may be controlled and the behavioral mode of the at least two ports may be communicated to at least one other node outside the node.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Computer networks have become complex in order to address complicated topologies and a variety of use cases. However, there may still be a need for a simple "per-Virtual Local Area Network (VLAN) active-active link", fast convergence solution that may be extended across multiple nodes and may be deployed in a multi-vendor environment. In addition, there may be a need for this solution to be safely deployed in cases where a Layer 2 (L2) domain extends beyond a node having this per-VLAN active-active link (or active-backup links).

In computer networks, it may be necessary to provide a simple solution for active-standby link redundancy. For example, this may be a way to provide active-backup internet connectivity or connectivity to a server via two separate Network Interface Cards (NICs). A logical representation may be where a device connects to a node that provides an "active uplink port" and a "backup uplink port" for example.

Examples of the aforementioned connectivity may exist for both Layer 3 (L3) and L2. For example, for L3 interfaces, routers may have backup interface features that were used in a dialup link to back up a serial Wide Area Network (WAN) interface. For L2, there may be an available similar feature known as flexible links (or switchport backup), where an Ethernet switchport may be configured as a primary link and a secondary link may be designated to act as a backup in the event of a failure of the primary link.

Networks have evolved to handle multi-path topologies, providing an "active-active" model. Examples may comprise "equal cost multi-path" or "equal cost routing" for L3, ether-channel bundling, and technologies like Provider Backbone Bridging (PBB) Ethernet Virtual Private Network (EVPN) provide L2 multi-pathing capabilities natively. Additionally, virtual L2 networks (e.g., VxLAN over IP) may provide multipathing via virtualized L2 tunnels.

However, despite the evolution of networks, there may still be a need for a cost effective way to provide active-standby connections. This may be particularly true for L2 level connections. For such cases, flexible links may provide features desired for this type of connection such as active-standby redundancy, per-VLAN load balancing to provide "per-VLAN active-active", fast convergence, preemption, and fast multicast convergence. Additionally, certain technologies have similar "per technology constructs" (e.g., for Multi-Protocol Label Switching (MPLS), backup cross connect types of features may be implemented by different vendors).

While these implementations may be designed as a single-hop, point-to-point solution, it may be difficult to combine multiples of such constructs. Additionally, they may to be used in "service termination points" and may not be good at a mid-point of an L2 network because they may not propagate L2 protocols for example. Therefore, these solutions may be for specific use cases and may not be extended to cover larger L2 networks. In other words, these conventional solutions may lack some important properties such as: i) by being point-to-point and intended to handle simple "active-backup" topologies, they may not interact with existing L2 protocols (e.g., spanning tree) and therefore may be prone to configuration errors causing network loops; ii) they may be link state based, so they may not work in cases where the link does not go down (e.g., connection via repeater); iii) if the network is not terminated at a peer device, there may be no standards based way to notify the change in the topology, similar to L2 networks Topology Change Notifications (TCN); and iv) they may not be extended if instead of a single device, it is necessary to have a network of devices or devices daisy chained to provide access to multiple devices.

Embodiments of the disclosure may provide flexible, multi-vendor per-VLAN active-active link redundancy that may be simple yet feature-full. This may be accomplished by splitting network ports into inside and outside facing interfaces and by collapsing an open ring or segment protocol to a single network device.

FIG. 1A shows an operating environment 100 for providing network link redundancy. As shown in FIG. 1A, operating environment 100 may comprise a node 105, a first network core 110, and a second network core 115. A first link 120 may connect node 105 and first network core 110. Similarly, a second link 125 may connect node 105 and second network core 115. A third link 130 may comprise a plurality of segments and may connect first network core 110 and second network core 115.

Node 105 may comprise, but is not limited to, an access network node or a Local Area Network (LAN) switch node. Furthermore, node 105 may comprise a plurality of ports that may include a first port 135 and a second port 140. First port 135 may comprise a first port inside facing portion 145 that uses a first protocol and a first port outside facing portion 150 that uses a second protocol. Similarly, second port 140 may comprise a second port inside facing portion 155 that uses the first protocol and a second port outside facing portion 160 that uses the second protocol.

Node 105 may operate using the first protocol. First port inside facing portion 145 and second port inside facing portion 155 may comprise termination points for the second protocol. Similarly, first port outside facing portion 150 and second port outside facing portion 160 may comprise termination points for the first protocol. The first protocol may comprise, but is not limited to, Resilient Ethernet Protocol (REP). The second protocol may comprise, but is not limited to, Multiple Spanning Tree (MST).

Figure 1B:
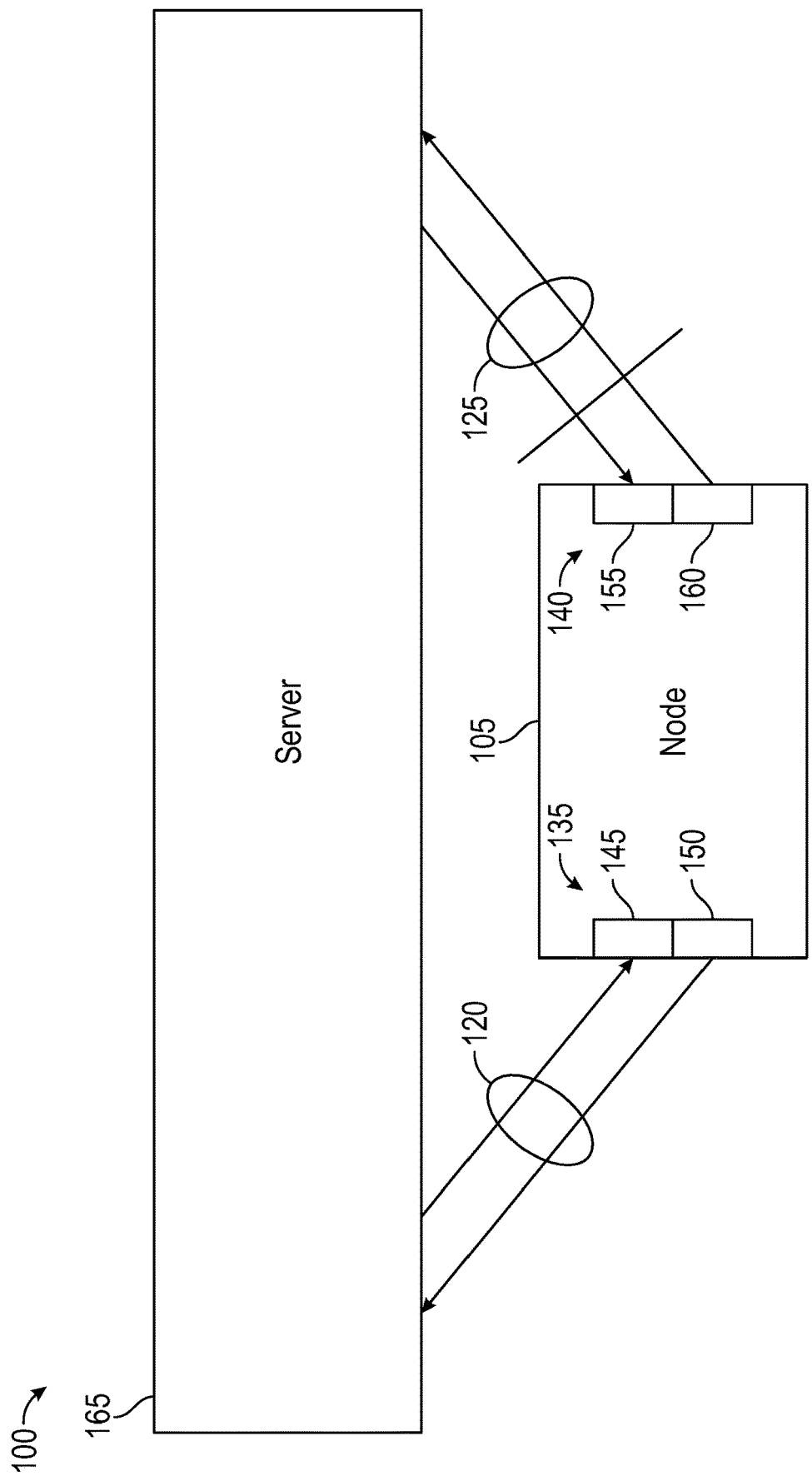
FIG. 1B is a block diagram of an operating environment.

Together, first network core 110 and second network core 115 may represent portions of a network (e.g., the Internet) that node 105 may connect to. First link 120 may comprise an active (i.e., primary) link to the network and second link 125 may comprise a backup (i.e., secondary) link to the network. In other embodiments, as illustrated by FIG. 1B, node 105 may connect to a server 165 and first link 120 may comprise an active (i.e., primary) link to server 165 and second link 125 may comprise a backup (i.e., secondary) link to server 165.

The elements described above of operating environment 100 (e.g., node 105, elements of first network core 110, elements of second network core 115, and server 165) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
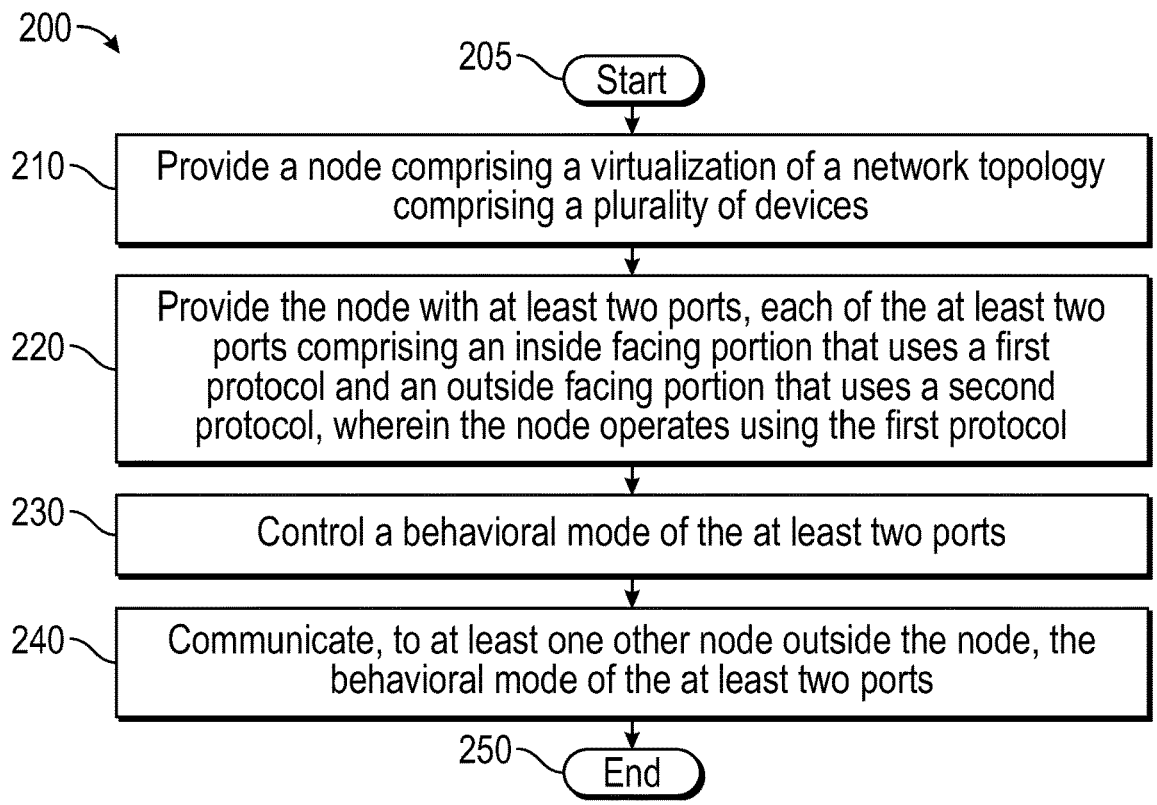
FIG. 2 is a flow chart of a method for providing network link redundancy.

FIG. 2 is a flow chart setting forth the general stages involved in a method 200 consistent with an embodiment of the disclosure for providing network link redundancy. Method 200 may be implemented using node 105 as described in more detail above with respect to FIG. 1A and FIG. 1B. Ways to implement the stages of method 200 will be described in greater detail below.

Method 200 may begin at starting block 205 and proceed to stage 210 where node 105 may provide a virtualization of a network topology comprising a plurality of devices. For example, the network topology may comprise a plurality of devices arranged in an open ring network topology or a segment network topology. Node 105 may virtualize the functionality of the plurality of devices. In other words, the functionality of the plurality of devices may be collapsed into and performed by one device (i.e., node 105), which may eliminate the need to have this functionality carried out by the plurality of devices.

From stage 210, where node 105 provides the virtualization of the network topology comprising the plurality of devices, method 200 may advance to stage 220 where node 105 may provide at least two ports. Each of the at least two ports may receptively be logically partitioned and may comprise an inside facing portion (e.g., first port inside facing portion 145 and second port inside facing portion 155) that may use a first protocol (e.g., comprising, but is not limited to, REP) and an outside facing portion (e.g., first port outside facing portion 150 and second port outside facing portion 160) that may use a second protocol (e.g., comprising, but is not limited to, MST).

Node 105 may operate internally using the first protocol. For example, logical partitioning of network ports into two portions, one to the "inside network" and one to the "outside network" may simplify the problem of "interworking". In conventional systems, the protocol uses a network port that has the attributes to connect to the "next hop". With embodiments of the disclosure, however, one network port may be divided in two portions, one inward, which may be the termination point for the protocol used outside node 105 and the other part may comprise the outward facing port that uses the protocol that is used internally to node 105.

Virtualizing the network topology in node 105 and providing logically partitioned ports to node 105 may provide a simple per-VLAN active-active construct with additional benefits that were not possible with conventional systems, comprising, but not limited to, interoperability to Institute of Electrical and Electronics Engineers (IEEE) L2 network extensions, multi-vendor support, and the ability to extend the number of access ports, for example. In addition, the logical partition of the port may allow for easier integration providing similar functionality provided by certain interworking functions.

Using REP as an example for the first protocol, an open ring network topology may be virtualized and collapsed into a single node. The first protocol may be terminated on the inward facing portion of the network port. In this example, the inward facing portion of the network port may comprise a REP protocol edge port. Consequently, the first protocol may run and may perform all actions inside node 105. However, externally, a connecting device may see the outward facing portion of the network port, which is not a REP port, but instead may be MST (e.g., an IEEE standard protocol).

Accordingly, in this example, embodiments of the disclosure may reduce the open ring to a single node, may virtualize the protocol end point to an inward facing portion of the network port, and may keep the outward facing portion of the network port always forwarding. In this way, embodiments of the disclosure may provide a per-VLAN active-active redundancy process with the advantages described above. Moreover, this process may be also be expanded to different internal protocols, L2 or L3, and different external interface/protocol types.

Once node 105 provides at least two ports in stage 220, method 200 may continue to stage 230 where node 105 may control a behavioral mode of the at least two ports. For example, at any point in time, only one interface (e.g., first port 135 or second port 140) may be in a linkup state and actively forwarding traffic. If the primary link (e.g., first link 120) shuts down, the standby link (e.g., second link 125) may take up the duty and starts forwarding traffic and may become the primary link. When the failing link comes back up active, it may go into standby mode and may not participate in traffic forwarding and may become the backup link. This behavior may be changed with pre-emption mode, which may make the failed link the primary link when it becomes available again.

After node 105 controls the behavioral mode of the at least two ports in stage 230, method 200 may proceed to stage 240 where node 105 may communicate, to at least one other node outside the node, the behavioral mode of the at least two ports. For example, node 105 may let nodes on the network outside node 105 know which port (e.g., first port 135 or second port 140) is currently being used as the primary link and which port is being used for the standby link. Once node 105 communicates, to the at least one other node outside the node, the behavioral mode of the at least two ports in stage 240, method 200 may then end at stage 250.

Consistent with embodiments of the disclosure, the first protocol (i.e., inside protocol) may comprise REP and the second protocol (i.e., outside protocol) may comprise MST. So for example, when there is a topology change, the "inside protocol" may decide about the change and may instruct the "outside protocol" to tell "neighbors" (e.g., switches outside node 105). The neighbors may be utilizing the outside protocol (i.e., the connected devices may understand the MST topology change notification). In some cases, the network may be so simple that it is not running the outside protocol (e.g., MST), but rather the connected devices (e.g., neighbors) may be pure Layer 2 (L2) switches. Or the case may be where convergence faster than normal MST timers may be needed. In these cases, embodiments of the disclosure may provide a packet that may be sent by node 105 that may make the connected L2 devices quickly update the forwarding table. In short, this may provide a process where node 105 may generate a packet that may cause the neighboring L2 switches (e.g., neighbors) to update the forwarding table quickly.

Figure 3:
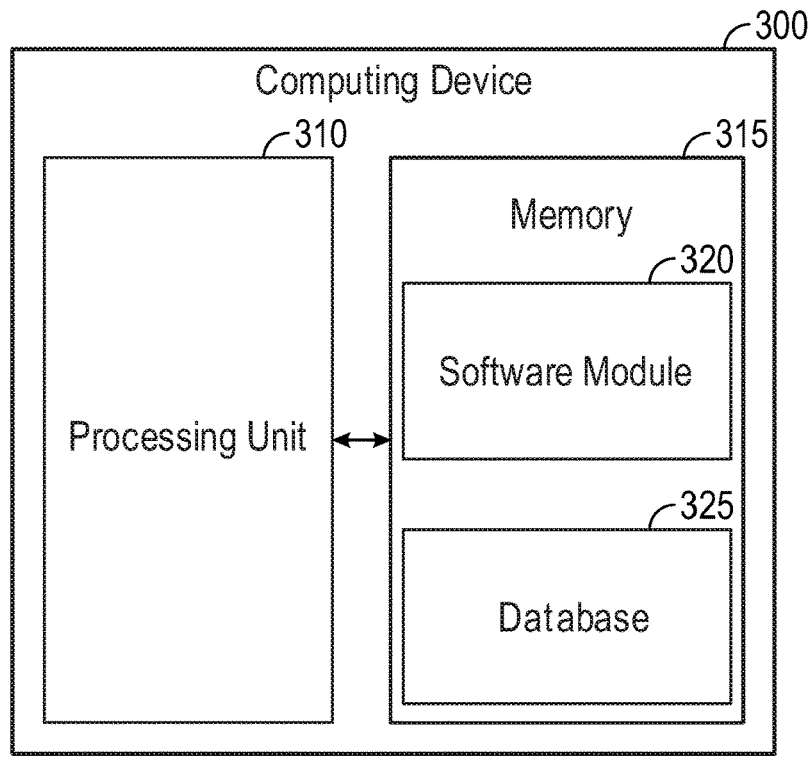
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing network link redundancy as described above with respect to FIG. 2. Computing device 300, for example, may provide an operating environment for node 105, elements of first network core 110, elements of second network core 115, or server 165. Node 105, elements of first network core 110, elements of second network core 115, and server 165 may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure may comprise a method. The method may comprise: providing a node comprising a virtualization of a network topology comprising a plurality of devices; providing the node with at least two ports, each of the at least two ports respectively comprising an inside facing portion that uses a first protocol and an outside facing portion that uses a second protocol, wherein the node operates using the first protocol; controlling a behavioral mode of the at least two ports; and communicating, to at least one other node outside the node, the behavioral mode of the at least two ports. The first protocol may comprise Resilient Ethernet Protocol (REP) and the second protocol may comprise Multiple Spanning Tree (MST). The inside facing portion may comprise a termination point for the second protocol and the outside facing portion may comprise a termination point for the first protocol. The behavioral mode may comprise active or standby. The network topology may comprise an open ring network topology or a segment network topology.

Embodiments of the disclosure may comprise a system. The system may comprise a memory storage and a processing unit coupled to the memory storage. The processing unit may be operative to: provide a node comprising a virtualization of a network topology comprising a plurality of devices; provide the node with at least two ports, each of the at least two ports respectively comprising an inside facing portion that uses a first protocol and an outside facing portion that uses a second protocol, wherein the node operates using the first protocol; control a behavioral mode of the at least two ports; and communicate, to at least one other node outside the node, the behavioral mode of the at least two ports. The first protocol may comprise Resilient Ethernet Protocol (REP) and the second protocol comprises Multiple Spanning Tree (MST). The inside facing portion may comprise a termination point for the second protocol and the outside facing portion may comprise a termination point for the first protocol. The behavioral mode may comprise active or standby. The network topology may comprise an open ring network topology or a segment network topology.

Embodiments of the disclosure may comprise a computer-readable medium that stores a set of instructions which when executed perform a method. The method may comprise: providing a node comprising a virtualization of a network topology comprising a plurality of devices; providing the node with at least two ports, each of the at least two ports respectively comprising an inside facing portion that uses a first protocol and an outside facing portion that uses a second protocol, wherein the node operates using the first protocol; controlling a behavioral mode of the at least two ports; and communicating, to at least one other node outside the node, the behavioral mode of the at least two ports. The first protocol may comprise Resilient Ethernet Protocol (REP) and the second protocol may comprise Multiple Spanning Tree (MST). The inside facing portion may comprise a termination point for the second protocol and the outside facing portion may comprise a termination point for the first protocol. The behavioral mode may comprise active or standby. The network topology may comprise an open ring network topology or a segment network topology.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1A and FIG. 1B may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
providing a node comprising a virtualization of a network topology comprising a plurality of devices;
providing the node comprising a first port and a second port, wherein the first port comprises a first port inside facing portion and a first port outside facing portion, wherein the second port comprises a second port inside facing portion and a second port outside facing portion, wherein each of the first port inside facing portion and the second port inside facing portion use a first protocol, wherein each of the first port outside facing portion and the second port outside facing portion uses a second protocol, and wherein the node operates using the first protocol;
controlling a behavioral mode of the at least two ports; and
communicating, to at least one other node outside the node, the behavioral mode of the at least two ports.

2. The method of claim 1, wherein the first protocol comprise Resilient Ethernet Protocol (REP).

3. The method of claim 1, wherein the second protocol comprises Multiple Spanning Tree (MST).

4. The method of claim 1, wherein each of the first port inside facing portion and second port inside facing portion comprises a termination point for the second protocol.

5. The method of claim 1, wherein each of the first port outside facing portion and second port outside facing portion comprises a termination point for the first protocol.

6. The method of claim 1, wherein the behavioral mode comprises one of active and standby.

7. The method of claim 1, wherein the network topology comprises one of an open ring network topology and a segment network topology.

8. A system comprising:
a memory storage; and
a processing unit coupled to the memory storage, wherein the processing unit is operative to:
provide a node comprising a virtualization of a network topology comprising a plurality of devices;
provide the node comprising a first port and a second port, wherein the first port comprises a first port inside facing portion and a first port outside facing portion, wherein the second port comprises a second port inside facing portion and a second port outside facing portion, wherein each of the first port inside facing portion and the second port inside facing portion use a first protocol, each of the first port outside facing portion and the second port outside facing portion use a second protocol, and wherein the node operates using the first protocol;
control a behavioral mode of the at least two ports; and
communicate, to at least one other node outside the node, the behavioral mode of the at least two ports.

9. The system of claim 8, wherein the first protocol comprise Resilient Ethernet Protocol (REP).

10. The system of claim 8, wherein the second protocol comprises Multiple Spanning Tree (MST).

11. The system of claim 8, wherein each of the first port inside facing portion and second port inside facing portion comprises a termination point for the second protocol.

12. The system of claim 8, wherein each of the first port outside facing portion and second port outside facing portion comprises a termination point for the first protocol.

13. The system of claim 8, wherein the behavioral mode comprises one of active and standby.

14. The system of claim 8, wherein the network topology comprises one of an open ring network topology and a segment network topology.

15. A non-transitory computer-readable medium that stores a set of instructions which when executed perform a method comprising:
providing a node comprising a virtualization of a network topology comprising a plurality of devices;
providing the node comprising a first port and a second port, wherein the first port comprises a first port inside facing portion and a first port outside facing portion, wherein the second port comprises a second port inside facing portion and a second port outside facing portion, wherein each of the first port inside facing portion and the second port inside facing portion use a first protocol, wherein each of the first port outside facing portion and the second port outside facing portion use a second protocol, and wherein the node operates using the first protocol;
controlling a behavioral mode of the at least two ports; and
communicating, to at least one other node outside the node, the behavioral mode of the at least two ports.

16. The non-transitory computer-readable medium of claim 15, wherein the first protocol comprise Resilient Ethernet Protocol (REP).

17. The non-transitory computer-readable medium of claim 15, wherein the outside facing portion uses a second protocol.

18. The non-transitory computer-readable medium of claim 17, wherein the second protocol comprises Multiple Spanning Tree (MST).

19. The non-transitory computer-readable medium of claim 15, further comprising sending a packet to a switch outside the node, the packet configured to cause the switch to update a forwarding table associated with the switch.

20. The non-transitory computer-readable medium of claim 15, wherein the behavioral mode comprises one of active and stand-by.

* * * * *